United States Patent
Kazakov et al.

(10) Patent No.: US 10,062,139 B2
(45) Date of Patent: Aug. 28, 2018

(54) VERTEX SHADERS FOR BINNING BASED GRAPHICS PROCESSING

(71) Applicant: QUALCOMM Incorporated, San Diego, CA (US)

(72) Inventors: Maxim Kazakov, San Diego, CA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/218,808

(22) Filed: Jul. 25, 2016

(65) Prior Publication Data

US 2018/0025463 A1     Jan. 25, 2018

(51) Int. Cl.
  *G06T 1/20*  (2006.01)
  *G06T 1/60*  (2006.01)
  *G06T 15/80* (2011.01)
  *G06T 15/00* (2011.01)

(52) U.S. Cl.
  CPC ............... *G06T 1/20* (2013.01); *G06T 1/60* (2013.01); *G06T 15/005* (2013.01); *G06T 15/80* (2013.01)

(58) Field of Classification Search
  CPC ........... G06T 1/20; G06T 1/60; G06T 15/005; G06T 15/80
  See application file for complete search history.

(56) References Cited

U.S. PATENT DOCUMENTS

| | | | |
|---|---|---|---|
| 8,289,319 B2 | 10/2012 | Nordlund et al. | |
| 8,294,713 B1 * | 10/2012 | Amanieux | G06T 15/50 |
| | | | 345/419 |
| 8,619,087 B2 | 12/2013 | Duluk, Jr. et al. | |
| 8,810,585 B2 | 8/2014 | Min et al. | |
| 9,093,006 B2 | 7/2015 | Cornell | |
| 9,384,523 B1 * | 7/2016 | Penner | G06F 9/48 |
| 2005/0030320 A1 * | 2/2005 | Munshi | G06T 11/40 |
| | | | 345/620 |
| 2007/0091090 A1 * | 4/2007 | Zhang | G06T 15/80 |
| | | | 345/426 |
| 2012/0223946 A1 | 9/2012 | Nystad et al. | |
| 2012/0223947 A1 * | 9/2012 | Nystad | G06T 15/005 |
| | | | 345/426 |

(Continued)

FOREIGN PATENT DOCUMENTS

EP     2945126 A2     11/2015

OTHER PUBLICATIONS

Open GL ES, Common Profile Specification, version 2.0.25, Nov. 2, 2010, The Khronos Group, 204 pp.

(Continued)

*Primary Examiner* — Mark K Zimmerman
*Assistant Examiner* — Phuc N Doan
(74) *Attorney, Agent, or Firm* — Shumaker & Sieffert, P.A.

(57) ABSTRACT

This disclosure describes examples of using two vertex shaders each one during different graphics processing passes in a binning architecture for graphics processing. A first vertex shader processes subset of attributes of a vertex in a binning pass, where the subset of attributes include those that contribute to visibility determination and attributes that may benefit from being processed with a vertex shader that provides functional flexibility. A second, different vertex shader processes another subset of attributes of the vertex in the rendering pass.

24 Claims, 5 Drawing Sheets

(56) References Cited

U.S. PATENT DOCUMENTS

| | | | |
|---|---|---|---|
| 2013/0135322 A1 | 5/2013 | Seetharamaiah et al. | |
| 2014/0066178 A1* | 3/2014 | Kelly | H04N 13/04 463/25 |
| 2014/0204080 A1* | 7/2014 | Goel | G06T 1/20 345/419 |
| 2014/0267232 A1 | 9/2014 | Lum et al. | |
| 2014/0267259 A1 | 9/2014 | Frascati et al. | |
| 2014/0267319 A1* | 9/2014 | Hakura | G06T 1/60 345/506 |
| 2014/0267320 A1* | 9/2014 | Hakura | G06T 1/20 345/506 |
| 2015/0302545 A1* | 10/2015 | Harris | G06T 1/20 345/501 |
| 2015/0332495 A1* | 11/2015 | Liao | G06T 11/40 345/501 |
| 2015/0379672 A1* | 12/2015 | Wang | G06T 15/80 345/423 |
| 2016/0005140 A1* | 1/2016 | Engh-Halstvedt | G06T 15/005 345/506 |
| 2016/0042560 A1* | 2/2016 | Chang | G06T 15/80 345/426 |
| 2016/0125649 A1* | 5/2016 | Jeong | G06T 15/405 345/422 |
| 2016/0148337 A1* | 5/2016 | Isomaki | G06T 11/40 345/502 |
| 2017/0372509 A1* | 12/2017 | Paltashev | G06T 15/405 |

OTHER PUBLICATIONS

Open GL ES, version 3.2, Jun. 15, 2016, The Khronos Group, Inc. 590 pp.

Response to Written Opinion dated Aug. 8, 2017 from corresponding PCT Application Serial No. PCT/US2017/035038 filed on Apr. 20, 2018 (18 pp).

International Search Report and Written Opinion—PCT/US2017/035038—ISA/EPO—dated Aug. 8, 2017.

* cited by examiner

VERTEX SHADERS FOR BINNING BASED GRAPHICS PROCESSING

TECHNICAL FIELD

This disclosure relates to graphics processing.

BACKGROUND

Computing devices often utilize a graphics processing unit (GPU) to accelerate the rendering of graphics data for display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU. Modern day CPUs are typically capable of concurrently executing multiple applications, each of which may need to utilize the GPU during execution.

SUMMARY

This disclosure is directed to selectively processing vertex attributes during different graphics processing passes through a graphics processing unit (GPU). Vertex attributes of a vertex that need to be transformed using complicated processing may be transformed by a first vertex shader during a binning pass. Vertex attributes of a vertex that do not need complicated processing may be transformed by a second vertex shader during a rendering pass. In some examples, the first vertex shader may be a software vertex shader executing on a programmable hardware shader core of the GPU, and the second vertex shader may be a fixed-function hardware shader formed on the GPU.

Rather than streaming out all vertex attributes needing from a vertex buffer during the binning pass, a subset of vertex attributes (e.g., those using complicated processing) are streamed out. Then, as part of the binning pass, the GPU may determine that some of vertices having attributes that were not streamed out do not need processing because those vertices are not visible. Accordingly, during the rendering pass, not all vertices having attributes that were not processed during the binning pass need to be outputted. In this way, the example techniques may reduce the amount of graphics data that needs to be outputted, thereby promoting memory bandwidth. Also, in examples where the second vertex shader is a fixed-function hardware shader, hardware acceleration may be available to process vertex attributes that do not need complicated processing, thereby promoting efficient processing.

In one example, the disclosure describes a method of processing data, the method comprising receiving from a vertex buffer a first subset of attributes of a vertex, processing the first subset of attributes of the vertex with a first vertex shader of a graphics processing unit (GPU) to generate a first subset of processed attributes, receiving from the vertex buffer a second subset of attributes of the same vertex, processing the second subset of attributes of the same vertex with a second, different vertex shader of the GPU to generate a second subset of processed attributes, and generating graphics data for display based on the first subset of processed attributes and the second subset of processed attributes.

In one example, the disclosure describes a device for processing data, the device comprising a system memory comprising a vertex buffer configured to store a first subset of attributes of a vertex and a second subset of attributes of the same vertex, and a graphics processing unit (GPU) comprising binning pass circuitry and rendering pass circuitry. The binning pass circuitry is configured to receive the first subset of attributes of the vertex, and process the first subset of attributes with a first vertex shader to generate a first subset of processed attributes. The rendering pass circuitry is configured to receive the second subset of attributes of the vertex, process the second subset of attributes with a second, different vertex shader to generate a second subset of processed attributes, and generate graphics data for display based on the first subset of processed attributes and the second subset of processed attributes.

In one example, the disclosure describes a computer-readable storage medium having instructions stored thereon that when executed cause a graphics processing unit (GPU) to receive from a vertex buffer a first subset of attributes of a vertex, process the first subset of attributes of the vertex with a first vertex shader of the GPU to generate a first subset of processed attributes, receive from the vertex buffer a second subset of attributes of the same vertex, process the second subset of attributes of the same vertex with a second, different vertex shader of the GPU to generate a second subset of processed attributes, and generate graphics data for display based on the first subset of processed attributes and the second subset of processed attributes.

In one example, the disclosure describes a device for processing data, the device comprising means for receiving from a vertex buffer a first subset of attributes of a vertex, means for processing the first subset of attributes of the vertex with a first vertex shader of a graphics processing unit (GPU) to generate a first subset of processed attributes, means for receiving from the vertex buffer a second subset of attributes of the same vertex, means for processing the second subset of attributes of the same vertex with a second, different vertex shader of the GPU to generate a second subset of processed attributes, and means for generating graphics data for display based on the first subset of processed attributes and the second subset of processed attributes.

The details of one or more examples of the disclosure are set forth in the accompanying drawings and the description below. Other features, objects, and advantages of the disclosure will be apparent from the description and drawings, and from the claims.

DETAILED DESCRIPTION

Various graphics processing techniques perform graphics processing in two passes. A first pass is referred to as a binning pass, in which a graphics processing unit (GPU) determines which primitives belong to which bin (also called a tile) and which primitives are visible. In a second pass, referred to as a rendering pass, the GPU renders each bin sequentially based on the determination of which primitives belong to which bin and the visibility of the primitives.

Such dual pass graphics processing architectures (sometimes referred to as streamout-based binning architectures) may be useful for various reasons. As one example, additional processing stages such as domain shaders, tessellation, geometry shaders can be added, and there is efficient overlap of binning and rendering due to time-separated geometry and rasterization processing.

The binning architecture may require multiple access to memory to stream out vertex data to memory and stream in vertex data from memory between binning and rendering. For example, fully transformed vertices are streamed out during binning. The transformed vertices are inputs for rendering, and therefore are streamed in during per-bin rendering. This disclosure describes example techniques to potentially reduce such memory traffic and associated power consumption.

During a binning pass, a vertex shader typically executes to process all attributes of a vertex and stores the resulting processed attribute values in a streamout buffer. However, having a vertex shader process all attributes of a vertex may not be memory bandwidth-efficient and processing-efficient. For example, a vertex shader may read all attribute values from a vertex buffer and store all resulting processed attribute values into the streamout buffer. Such retrieving and storing of attribute values may require multiple calls to memory. Also, some of the processes that are performed on the attributes during the binning pass may be "trivial" and can easily be performed during the rendering pass. One example of trivial processing is matrix multiplication with a static matrix.

This disclosure describes example techniques in which a binning pass vertex shader is configured to process those attributes that contribute to a visibility determination of the vertex and any attributes that require non-trivial processing during a binning pass, and not process any of the attributes that do not contribute to a visibility determination or do not require non-trivial processing. Then, during the rendering pass, the rendering vertex shader may retrieve the non-processed attributes for the vertices and perform vertex shading operations. In some examples, the binning vertex shader is a software vertex shader executing on programmable circuitry, and the rendering vertex shader is a hardware vertex shader formed from fixed-function circuitry.

In this way, the binning vertex shader may retrieve a subset of all of the attributes of a vertex (e.g., may only retrieve attributes that contribute to visibility determination or that require non-trivial processing). This results in less processing that needs to be performed by the binning vertex shader, which may also result in less attribute data that the binning vertex shader needs to store in the streamout buffer. Then, during the rendering pass, the rendering vertex shader may only retrieve unprocessed attributes for vertices that were determined to contribute to the visible primitives. This results in avoiding the processing during a binning pass of certain attributes (e.g. attributes that do not contribute to visibility determination and that do not require non-trivial processing, i.e., require more than non-trivial processing) for vertices that do not contribute to the visible primitives.

Accordingly, this disclosure describes a hybrid vertex shader process where rather than using one vertex shader, there may be two vertex shaders, with each vertex shader configured to process a subset of attributes. For instance, a compiler executing on a processor that is compiling the source code for the binning vertex shader may determine which attributes of vertices stored in the vertex attributes contribute to visibility determination and which attributes need non-trivial processing. The compiler may compile the binning vertex shader source code such that these attributes are processed by the binning vertex shader and the others (not contributing to visibility determination or need more than non-trivial processing) are not. A shader core of the GPU may execute the binning vertex shader during the binning pass, and then during rendering, the rendering vertex shader processes those attributes that were not processed during the binning pass of vertices that were determined to be visible during the binning pass.

Figure 1:
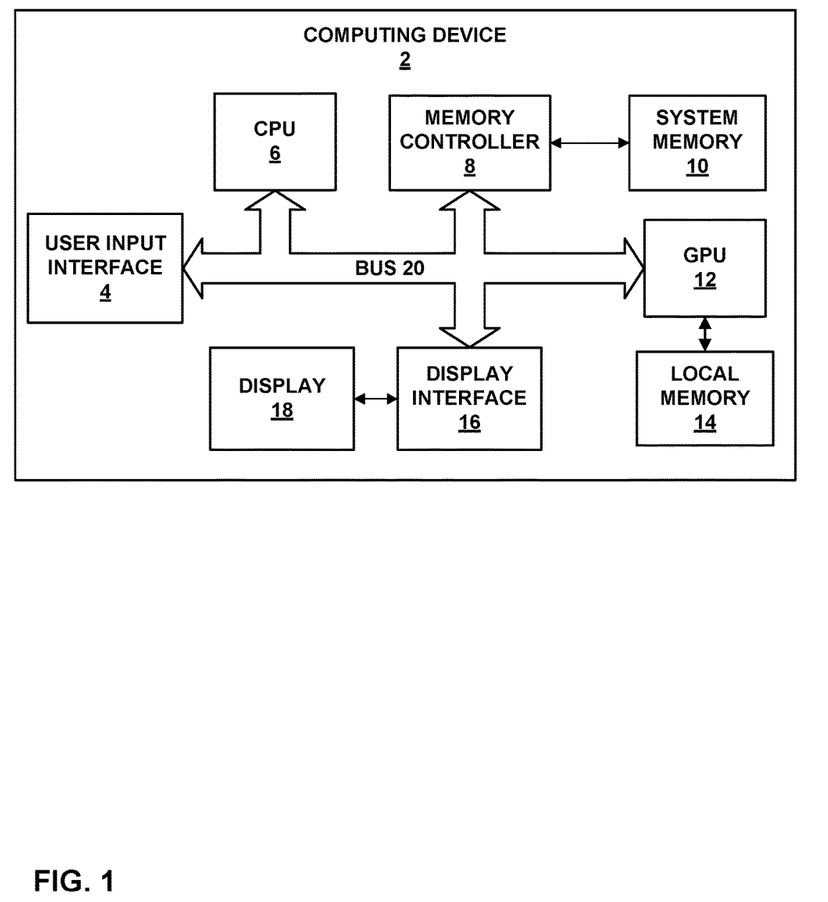
FIG. 1 is a block diagram illustrating an example computing device that may be used to implement the techniques of this disclosure.

FIG. 1 is a block diagram illustrating an example computing device 2 that may be used to implement techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14 of GPU 12, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GPU local memory 14. Thus, GPU 12 may read data from and write data to GPU local memory 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

The techniques described in this disclosure relate to graphics processing in a binning architecture. In a binning architecture, GPU 12 generates graphics data for display in two passes: binning pass and rendering pass. In the binning pass, GPU 12 determines whether vertices of primitives belong to a bin (also referred to as a tile). Each tile includes N×M number of pixels, and generally conforms to a size that allows the pixel values to be stored in local memory 14. In addition, during the binning pass, GPU 12 may perform a depth test to determine whether any vertex is occluded by any other vertex so that the occluded vertex can be removed from further processing. At the conclusion of the binning pass, GPU 12 may have generated vertex data for a plurality of visible vertices along with information identifying to which tile (i.e., bin) the visible vertices belong.

Next, in the rendering pass, GPU 12 may render pixels based on the vertex data for the plurality of vertices. For example, GPU 12 may rasterize the vertices of the primitives, and generate pixel values for the pixels within the primitives. GPU 12 may output the pixel values to system memory 10 (e.g., a frame buffer in system memory 10). Display interface 16 may retrieve these pixel values from system memory 10, perform further processing, and output information based on the resulting pixel values to display 18.

As part of the binning pass, a vertex shader of GPU 12 retrieves vertex information for vertices from a vertex buffer and processes the vertex information to generate the vertex data. The vertex shader is in many cases a software vertex shader executing on a shader core of GPU 12.

The vertex information stored in the vertex buffer is generated by an application executing on CPU 6, but may be generated by other ways as well. The vertex information generally refers to a plurality of vertex attributes such as coordinate information, opacity, and the like for each vertex (e.g., each vertex is associated with a plurality of vertex attributes). Part of the functionality of the vertex shader may be to transform the 3D coordinate of each vertex into a 2D coordinate which will define the 2D coordinate on display 18. The output of vertex shader is also a depth value for the vertex. There may be other functions that the vertex shader performs such as lighting and shading.

In some techniques, unlike those of this disclosure, for a vertex, the vertex shader retrieves all of the vertex attributes of a vertex for processing as part of the binning pass. However, processing all vertex attributes for each vertex may not be processing or memory bandwidth efficient.

For example, subsequent to the processing of a vertex, GPU 12 may determine whether that vertex is visible or not visible, and if not visible, GPU 12 discards that vertex from further processing (e.g., its processed attributes are not stored). However, although the result may be that GPU 12 discarded a vertex from further processing as part of the binning pass, GPU 12 still processed attributes of vertices that did not contribute to the final rendered image. Accordingly, GPU 12 retrieved attributes of a vertex from system memory 10 and processed these attributes of a vertex that is subsequently discarded, which results in unnecessary memory bandwidth usage and inefficient processing.

This disclosure describes using two different vertex shaders to perform graphics processing. The first vertex shader may be configured to retrieve attribute data for attributes of a vertex that contribute to the visibility determination of that vertex (and for reasons below, attributes that may be visible or not visible but need non-trivial transformation). Because the first vertex shader is retrieving a subset of attribute data, there may be a reduction in the amount of data the GPU 12 needs to retrieve from system memory 10 as compared to when all attribute data is retrieved. The first vertex shader may perform its operations during the binning pass. As part of the binning pass, GPU 12 may output the processed attribute data for vertices that passed the depth test (e.g., that are visible).

The second vertex shader is configured to retrieve unprocessed attributes of only those vertices that were not discarded. The second vertex shader may perform its operations during the rendering pass.

Accordingly, this disclosure describes processing a first subset of attributes of a vertex with a first vertex shader to generate a first subset of processed attributes and processing a second subset of attributes of the same vertex with a second vertex shader to generate a second subset of processed attributes. GPU 12 may generate graphics data used for display based on the first subset of processed attributes and the second subset of processed attributes.

In this way, there are some attributes of vertices that are eventually discarded for not being visible that are never read from memory by a vertex shader. For instance, in some of the other techniques, all attributes for all vertices are read and potentially processed, and then, some of the vertices are discarded. Here, attributes of a vertex that contribute to the visibility determination are read (and possibly those benefiting from programmable vertex shading), and other are not. If this vertex is eventually discarded, the remaining unread attributes do not need to be accessed and processed, saving memory bandwidth and computational cycles.

As descried above, some vertex shaders may be software executing on a programmable shader core of GPU 12. Because the shader core of GPU 12 is programmable, a software-based vertex shader may provide functional flexibility and allow for complex processing tasks. For instance, the shader core of GPU 12 may be configured in most any conceivable way to perform the functions of the vertex shader.

However, not all attribute processing needs the functional flexibility that a software-based vertex shader provides. Many types of attribute processing require very limited types of processing. For some attributes of a vertex, processing such attributes via a hardware fixed-function circuit (e.g., non-programmable) may result in faster processing and require less computational power as compared to processing such attributes with software-based vertex shader.

In some examples, the first vertex shader that performs its operations during the binning pass may be a software-based vertex shader. During the binning pass, in addition to processing attributes that contribute to visibility determination, the first vertex shader may process attributes that benefit from functional flexibility available on a programmable shader core. The second vertex shader that performs its operations during the rendering pass may be a fixed-function hardware vertex shader. The fixed-function vertex shader provides limited functional flexibility and may be hardwired to perform limited operations. Although the second vertex shader is a hardwired vertex shader circuit configured to perform fixed-functions, the second vertex shader may perform its operations faster and by consuming less power than if a software-based vertex shader is used.

In this disclosure, the first vertex shader is described as performing operations on attributes that contribute to visibility information or determination and attributes that benefit from software-based vertex shading (sometimes referred to as non-trivially transformed attributes), and the second vertex shader is described as performing operations on attributes that do not benefit from a software-based vertex shader (sometimes referred to as trivially transformed attributes). However, the techniques described in this disclosure are not so limited. In general, the first vertex shader may be configured to process a first subset of attributes of a vertex and the second vertex shader may be configured to process a second subset of attributes. In some, although not necessary all, the second subset of attributes may be those for which fixed-function circuitry is sufficient for processing, and the first subset of attributes may be those that provide visibility information and those for which fixed-function circuitry is not sufficient for processing.

In the example techniques, the first vertex shader may be configured to retrieve and process a subset of attributes of a vertex. However, which subset of attributes the first vertex shader is to retrieve and process may not be known by the developer who developed the source code for the first vertex shader. In some example techniques, a compiler executing on CPU 6 may compile the source code of the first vertex shader during runtime. As part of the complication, the compiler may include instructions instructing which subset of attributes the first vertex shader is to retrieve and process or remove instructions that would cause the first vertex shader to retrieve and process attributes that the first vertex shader is not to retrieve and process.

Figure 2:
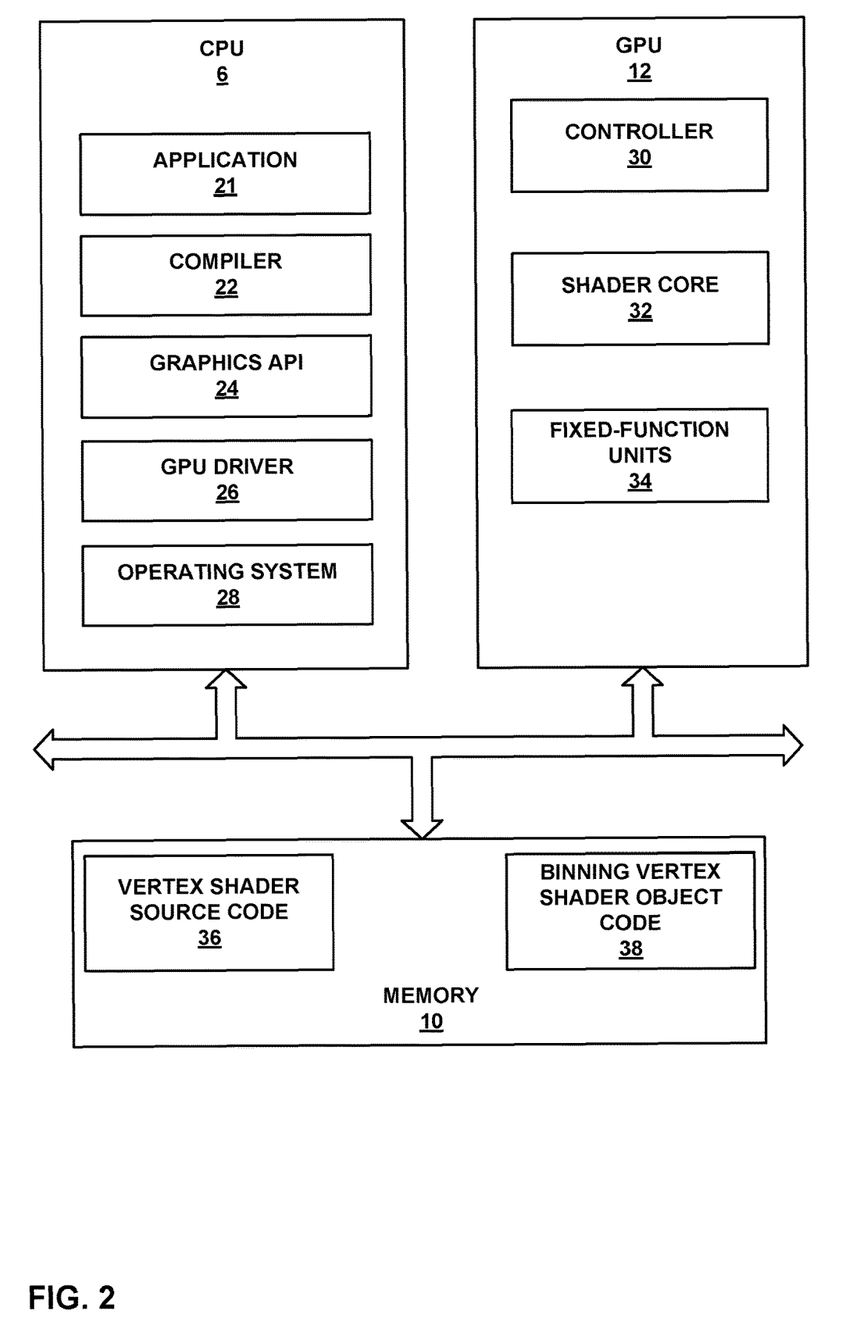
FIG. 2 is a block diagram illustrating a CPU, a GPU and a memory of the computing device of FIG. 1 in further detail.

FIG. 2 is a block diagram illustrating CPU 6, GPU 12 and memory 10 of computing device 2 of FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC). CPU 6 is configured to execute application 21, compiler 22, a graphics API 24, a GPU driver 26, and an operating system 28. GPU 12 includes a controller 30, shader core 32, and one or more fixed-function units 34.

Software application 21 may include at least one of one or more instructions that cause graphic content to be displayed or one or more instructions that cause a non-graphics task (e.g., a general-purpose computing task) to be performed on GPU 12. Software application 21 may issue instructions to graphics API 24. Graphics API 24 may be a runtime service that translates the instructions received from software application 21 into a format that is consumable by GPU driver 26. In some examples, graphics API 24 and GPU driver 26 may be part of the same software service.

GPU driver 26 receives the instructions from software application 21, via graphics API 24, and controls the operation of GPU 12 to service the instructions. For example, GPU driver 26 may formulate one or more command streams, place the command streams into memory 10, and instruct GPU 12 to execute command streams. GPU driver 26 may place the command streams into memory 10 and communicate with GPU 12 via operating system 28, e.g., via one or more system calls.

Controller 30 is configured to retrieve the commands stored in the command streams, and dispatch the commands for execution on shader core 32 and one or more fixed-function units 34. Controller 30 may dispatch commands from a command stream for execution on all or a subset of shader core 32 and one or more fixed-function units 34. Controller 30 may be hardware of GPU 12, may be software or firmware executing on GPU 12, or a combination of both.

Shader core 32 includes programmable circuitry (e.g., processing cores on which software executes). One or more fixed-function units 34 include fixed function circuitry configured to perform limited operations with minimal functional flexibility. Shader core 32 and one or more fixed-function units 34 together form a graphics pipeline configured to perform graphics processing.

Shader core 32 may be configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, shader core 32 may include a plurality of processing units that are configured to operate in parallel, e.g., an SIMD pipeline. Shader core 32 may have a program memory that stores shader program instructions and an execution state register, e.g., a program counter register that indicates the current instruction in the program memory being executed or the next instruction to be fetched. Examples of shader programs that execute on shader core 32 include, for example, vertex shaders, pixel shaders (also referred to as fragment shaders), geometry shaders, hull shaders, domain shaders, compute shaders, and/or unified shaders.

Fixed-function units 34 may include hardware that is hard-wired to perform certain functions. Although the fixed function hardware may be configurable, via one or more control signals, for example, to perform different functions, the fixed function hardware typically does not include a program memory that is capable of receiving user-compiled programs. In some examples, one or more fixed-function units 34 may include, for example, processing units that perform raster operations, such as, e.g., depth testing, scissors testing, alpha blending, etc.

GPU driver 26 of CPU 6 may be configured to write the command streams to memory 10, and controller 30 of GPU 12 may be configured to read the one or more commands of command streams from memory 10. In some examples, one or both of command streams may be stored as a ring buffer in memory 10. A ring buffer may be a buffer with a circular addressing scheme where CPU 6 and GPU 12 maintain synchronized state variables associated with the writing of data to and reading of data from the ring buffer.

For example, if the first command stream is a ring buffer, each of CPU 6 and GPU 12 may store a write pointer indicating the next address to be written to in the ring buffer, and a read pointer indicating the next address to be read from in the ring buffer. When CPU 6 writes a new command to the ring buffer, CPU 6 may update the write pointer in CPU 6 and instruct GPU 12 to update the write pointer in GPU 12. Similarly, when GPU 12 reads a new command from the ring buffer, GPU 12 may update the read pointer in GPU 12 and instruct CPU 6 to update the read pointer in CPU 6. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 26 and an example GPU controller 30 designed in accordance with this disclosure will now be described with respect to FIG. 2. GPU driver 26 receives one or more instructions from software application 21 that specify graphics operations and/or general-purpose computing operations to be performed by GPU 12. GPU driver 26 places the output command stream into memory 10, which is accessible by GPU controller 30. GPU driver 26 notifies GPU controller 30 that the command stream corresponding to software application 21 is available for processing. For example, GPU driver 26 may write to a GPU register (e.g., a GPU hardware register polled by GPU 12 and/or a GPU memory-mapped register polled by GPU 12) one or more values indicating that the command stream is ready for execution.

Upon notification that the command stream is ready for execution, controller 30 of GPU 12 may determine if resources are currently available on GPU 12 to begin executing the command stream. If resources are available, controller 30 begins to dispatch the commands in the command stream.

As part of graphics processing, CPU 6 may offload certain graphics processing tasks to GPU 12. For instance, application 21 may generate attribute data for attributes of a plurality of vertices of primitives that interconnect to form a graphical object. Application 21 may store the attribute data in a vertex buffer in memory 10. Graphics driver 26 may instruct controller 30 to retrieve the attribute data for the attributes of the vertices for processing to generate graphics data for display.

In the example techniques described in this disclosure, graphics driver 26 and/or controller 30 may be configured to cause GPU 12 to generate graphics data in two passes: binning pass and rendering pass. In the binning pass, graphics driver 26 and/or controller 30 may define a size of a bin (also referred to as a tile) (e.g., number of N×M pixels). Controller 30 may then cause shader core 32 and one or more fixed-function units 34 to perform respective operations to determine which primitives belong in which tile and which vertices are visible. In the rendering pass, controller 30 may cause shader core 32 and one or more fixed-function unit 34 to perform respective operations on a per-bin basis to render the graphics data on a bin-by-bin basis. GPU 12 stores the resulting graphics data in memory 10 for retrieval and display.

Part of the graphics processing includes vertex processing that is generally performed by GPU 12 executing a vertex shader on shader core 32. For instance, the vertex shader may perform coordinate conversion, lighting, shading, and other such processes on the attribute data of the attributes of each vertex. Application 21 may be bound with a vertex shader, and application 21 may issue the command via graphics driver 26 that instructs controller 30 to retrieve object code for a vertex shader for execution on shader core 32.

In some techniques, the vertex shader retrieves all of the attribute data for the attributes of a vertex and performs vertex processing operations. However, not all vertices are visible, and therefore the vertex shader unnecessarily performed operations as well as unnecessarily consumed memory bandwidth retrieving the attribute data. Moreover, a software-based vertex shader may provide functional flexibility, but there may be many processes that do not require functional flexibility and may be performed by fixed-function circuitry instead.

In the example techniques described in this disclosure, controller 30 may cause GPU 12 to perform vertex shading using two different vertex shaders. In some examples, controller 30 may cause shader core 32 to execute a first vertex shader during the binning pass and cause a second vertex shader to perform its operation during the rendering pass.

The first vertex shader may be referred to as a binning pass vertex shader, and the second vertex shader may be referred to as a rendering pass vertex shader. As described in more detail, the binning pass vertex shader may be a software-based vertex shader and, although not required, the rendering pass vertex shader may be hardware fixed-function based vertex shader.

During the binning pass, controller 30 may retrieve binning vertex shader object code 38, which is the object code of the binning pass vertex shader, and execute binning vertex shader object code 38 on shader core 32 to perform certain vertex shading operations. In general, the execution of binning vertex shader object code 38 may cause shader core 32 to process a subset of attributes (i.e., process attribute data for a subset of attributes) of a vertex rather than process all of the attributes of the vertex. For instance, binning vertex shader object code 38 may be configured such that the binning pass vertex shader only processes attributes that contribute to the determination of whether the vertex is visible and processes attributes that cannot be processed by the rendering pass vertex shader or are better processed with the binning pass vertex shader. As described above, in some examples, the rendering pass vertex shader may be fixed function vertex shader (e.g., non-programmable), and therefore, attributes that benefit from dynamic calculations may be better suited to be performed by the binning pass vertex shader than the rendering pass vertex shader.

Examples of attributes that contribute to the visibility determination include coordinates and opacity values. Examples of attributes that may be better suited for binning pass vertex shader (e.g., attributes that may benefit from functional flexibility of a software vertex shader) include dynamic matrix calculations/skinning, non-linear vertex transformations, multi-attribute combinations, and the like.

In the example techniques described in this disclosure, compiler 22 may be configured to generate binning vertex shader object code 38. As illustrated, memory 10 may store vertex shader source code 36. At runtime (e.g., while application 21 is executing), operating system 28 may retrieve vertex shader source code 36 from memory 10 and provide vertex shader source code 36 to compiler 22 for compiling.

During development of vertex shader source code 36 by a developer, the developer may not be aware of which attributes will need processing that benefits from a software-based vertex shader and which attributes can be processed with a fixed-function vertex shader during execution of application 21. Accordingly, vertex shader source code 36 may include instructions to perform operations on all of the attributes of a vertex.

However, based on the actual instructions issued by application 21, compiler 22 may determine whether particular instructions within vertex shader source code 36 should be compiled and included in binning vertex shader object code 38. Operating system 28 may provide the instructions issued by application 21 to compiler 22 for compiler 22 to determine whether particular instructions within vertex shader source code 36 should be compiled and included in binning vertex shader object code 38.

As an example, application 21 may issue an instruction indicating that certain attributes (e.g., attribute data of certain attributes) are to be multiplied by a dynamic matrix (e.g., a matrix having values unknown until later in the execution). In this case, compiler 22 may determine that this instruction is better to be executed by the binning pass vertex shader than by the rendering pass vertex shader because the matrix values will not be known until later. Accordingly, compiler 22 may compile instructions in vertex shader source code 36 for performing this matrix multiplication and include these instructions in binning vertex shader object code 38.

As another example, application 21 may issue an instruction indicating that certain attributes (e.g., attribute data of certain attributes) are to be transformed using a non-linear set of operations. In this case, compiler 22 may be configured to compile all instructions in vertex shader source code 36 that include non-linear transformations and include such instructions in binning vertex shader object code 38.

As another example, application 21 may issue an instruction indicating that certain attributes (e.g., attribute data of certain attributes) are to be multiplied by a static matrix. In this case, compiler 22 may not compile instructions in vertex shader source code 36 to perform this multiplication and such instructions would not be included in binning vertex shader object code 38. In this example, when shader core 32 executes binning vertex shader object code 38 of the binning pass vertex shader, shader core 32 may not perform the matrix multiplication. Rather, the matrix multiplication will occur as part of the rendering pass.

In the above examples, compiler 22 is described as avoiding the compilation of certain instructions; however, the example techniques are not so limited. In some examples, compiler 22 may be configured to include instructions that are to be compiled and separate out instructions that are be performed by the rendering pass vertex shader.

Furthermore, part of the binning pass includes a depth test for visibility determination. Accordingly, compiler 22 may be configured to maintain all instructions in vertex shader source code 36 that include processing coordinates and opacity values, even if such instructions do not require programmable flexibility, so that coordinate and opacity values are available in the binning pass for determining whether a vertex is visible or occluded.

The binning pass vertex shader, having the binning vertex shader object code 38 performs operations on a subset of the attributes of a vertex rather than all of the attributes. Because the binning pass vertex shader performs operations on a subset of attributes, the amount of attribute data that controller 30 retrieves as part of the execution of binning vertex shader code 38 on shader core 32 may be reduced as compared to a vertex shader that retrieves all of the attribute data. In some cases, attributes that utilize operations such as dynamic matrix calculations/skinning, non-linear vertex transformations, multi-attribute combinations, etc., are relatively rare. Therefore, there may be a reduction in memory bandwidth and increase in processing efficiency as shader core 32 performs operations on fewer attributes.

The result of execution of the binning pass vertex shader is processed vertex attributes. For example, controller 30 may retrieve from a vertex buffer in memory 10 a subset of attributes that are processed by the binning pass vertex shader which executes on shader core 32. The execution of the binning pass vertex shader may cause shader core 32 to generate processed vertex attributes, where the processed vertex attributes are a subset of all processed vertex attribute that are to be generated.

As part of the binning pass, GPU 12 (e.g., via one of one or more fixed-function units 34) may determine a vertex is visible. GPU 12 may store in memory 10 processed vertex attributes if the vertex is visible and discard processed vertex attributes if the vertex is not visible. Because GPU 12 stores processed vertex attributes for visible vertices and not for occluded vertices, and the processed vertex attributes are a subset of all the vertex attributes, there may be further reduction in the amount of data that needs to stored.

The attributes that were not processed remain stored in the vertex buffer. Also, compiler 22 may leave instructions of vertex shader source code 36 that were not compiled in a local memory of CPU 6 or possible in memory 10. In the example techniques described in this disclosure, GPU driver 26 may output the instructions that were not compiled to controller 30 for execution and the attributes that were not processed to controller 30 for processing as part of the rendering pass.

In the rendering pass, controller 30 may provide the instructions and the attributes to the rendering pass vertex shader, which may be a fixed-function unit of one or more fixed-function units 34. The rendering pass vertex shader may be configured to perform limited functions such as 3×3 or 4×4 matrix vector multiplication with static matrices, vector normalization (Vec3), and scaling. In the techniques described in this disclosure, rendering pass vertex shader may be performing operations on subset of attributes of vertices that were determined to be visible. The binning pass vertex shader may have already performed operations on a subset of attributes of all vertices, and the rendering pass vertex shader may perform operations on the remaining subset of attributes, but only for vertices determined to be visible.

In this way, processing efficiency gains may be realized in two ways. For a particular vertex, only a subset of attributes may be processed by the binning pass vertex shader, and if that vertex is determined to not be visible, no computational resources are wasted in processing the remaining attributes of the vertex. Additionally, using a fixed-function rendering pass vertex shader may be computationally more efficient than a software-based binning pass vertex shader because computational resources associated with overhead in software processing (e.g., function calling, loop management, etc.) may be avoided.

Although the above example describes rendering pass vertex shader as being a fixed-function vertex shader, the example techniques are not so limited. In some examples, rendering pass vertex shader may be a software-based vertex shader. Even in such examples, there may be memory bandwidth gains because rendering pass vertex shader may not execute instructions to process attributes that were determined to not be visible. For ease of description, this disclosure describes the rendering pass vertex shader as being a fixed-function vertex shader.

Figure 3:
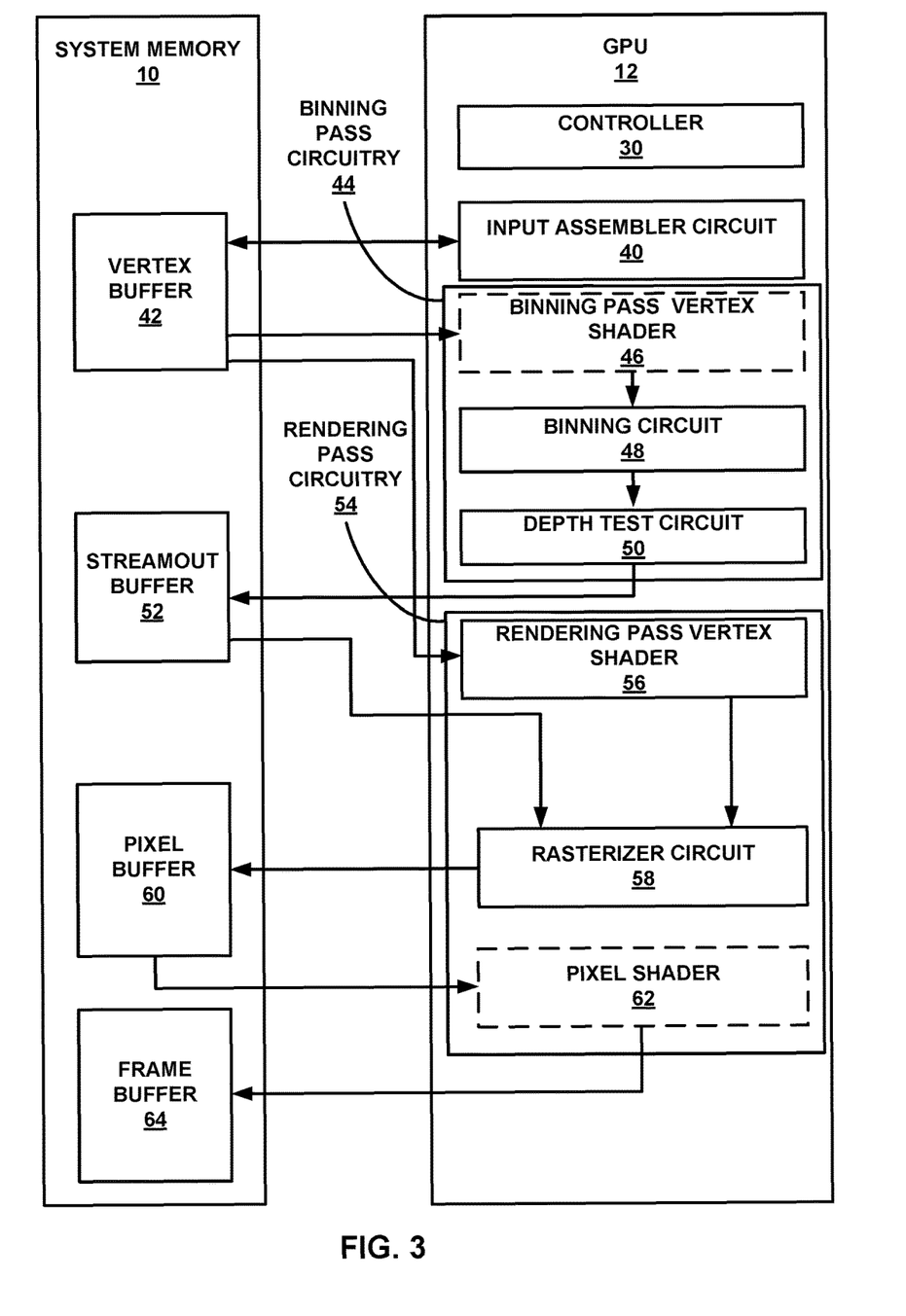
FIG. 3 is a block diagram illustrating an example of a graphics processing unit (GPU) that may implement an example of a graphics processing pipeline in accordance with one or more example techniques described in this disclosure.

FIG. 3 is a block diagram illustrating an example of a graphics processing unit (GPU) that may implement an example of a graphics processing pipeline in accordance with one or more examples described in this disclosure. To perform graphics operations, GPU 12 may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

In this example, GPU 12 may include one or more of controller 30, input assembler circuit 40, binning pass circuitry 44, and rendering pass circuitry 54. Binning pass circuitry 44 includes binning pass vertex shader 46, which is illustrated in dashed lines to indicate that binning pass vertex shader 46 executes on shader core 32 of GPU 12. For example, binning pass circuitry 44 includes shader core 32 on which binning pass vertex shader 46 executes. Binning pass circuitry 44 also includes binning circuit 48 and depth test circuit 50. Rendering pass circuitry 54 includes rendering pass vertex shader 56, rasterizer circuit 58, and pixel shader 62, which is illustrated in dashed lines to indicate that pixel shader 62 executes on shader core 32.

Shader core 32 may execute other types of shaders as well such as a hull shader and domain shader that follow the vertex shader stage in that order, and are used for tessellation. Tessellation circuitry may also be included in one or more fixed-function units 34 for performing the tessellation. Shader core 32 may also execute a geometry shader that receives the output of the domain shader, if shader core 32 executes the domain shader, or the output of a vertex shader, if no domain shader is executed. Rasterizer circuit 58 may receive graphics data generated by binning pass vertex shader 46 and rendering pass vertex shader 56, as illustrated, or from the geometry shader (when available) or domain shader (when available).

Other configurations of the graphics pipeline are possible, and the techniques descried in this disclosure should not be considered limited to the specific example illustrated in FIG. 3. For example, GPU 12 may include more stages than those illustrated, and in some examples, GPU 12 may not necessarily include all of the illustrated stages. Also, the specific ordering of the stages is provided for purposes of illustration and should not be considered limiting.

FIG. 3 also illustrates the various buffers in memory 10 used to store intermediate graphics data as the graphics data is being generated through the graphics pipeline of GPU 12. As illustrated, memory 10 includes vertex buffer 42, streamout buffer 52, pixel buffer 60, and frame buffer 64. These buffers may be part of the same larger buffer or may be separate buffers.

Application 21 may cause CPU 6 to output vertex data (e.g., attribute data) of vertices to vertex buffer 42. Input assembler circuit 40 may read vertex points of vertices from system memory 10 as defined by CPU 6, and assemble the control points to form the vertices. For instance, input assembler circuit 40 may read the coordinates, color values, and other such information. The coordinates, color values, and other such information may be commonly referred to as attributes of the vertices. Based on the attributes of the vertices, input assembler circuit 40 may determine the general layout of the primitives. Input assembler circuit 40 may be a fixed-function unit.

Binning pass vertex shader 46 may receive the attribute data for the attributes of vertices. However, as described in this disclosure, binning pass vertex shader 46 may retrieve a subset of the attributes such as those that contribute to visibility determination and that benefit from functional flexibility provided by a software-based vertex shader. Binning pass vertex shader 46 may perform per-vertex operations such as transformations, skinning, morphing, and per-vertex lighting. Compiler 22 may have determined which instructions binning pass vertex shader 46 is to execute based on the instructions generated by application 21. Accordingly, binning pass vertex shader 46 may receive from vertex buffer 42 a first subset of attributes of a vertex, and may process the first subset of attributes to generate a first subset of processed attributes.

Binning circuit 48 receives the output from binning pass vertex shader 46 and determines to which tile (e.g., bin) a vertex belongs. For instance, the output of binning pass vertex shader 46 may be an x and y coordinate pair in viewer perspective, and a depth value. Binning circuit 48 may utilize the x and y coordinates to determine to which tile that vertex belongs, as well as generate any additional graphics data needed for rendering by rendering pass circuitry 54. Binning circuit 48 may be a fixed function unit of one or more fixed-function units 34.

Depth test circuit 50 may compare the z-coordinates of vertices processed by binning pass vertex shader 46 to determine whether a vertex is visible or not visible. Depth test circuit 50 may output the processed attributes of the vertices that are visible to streamout buffer 52. Again, not all attributes of the vertex may have been processed. There may be some attributes, such as those that do not need the functional flexibility provided by binning pass vertex shader 46, that have not yet been processed.

Rendering pass vertex shader 56 receives the attributes from vertex buffer 42 that were not processed by binning pass vertex shader 46. However, rendering pass vertex shader 56 may process attributes of only vertices that were determined to be visible. Accordingly, rendering pass vertex shader 56 may receive from vertex buffer 42 a second subset of attributes of the same vertex as binning pass vertex shader 46, and may process the second subset of attributes of the same vertex to generate a second subset of processed attributes. As described in more detail, the remaining stages in the graphic pipeline of GPU 12 may generate graphics data used for display based on the first subset of processed attributes (e.g., at least those for vertices determined to be visible) and the second subset of processed attributes.

For example, graphics driver 26 may track for which vertices processed attributes are stored during the binning pass. Graphics driver 26 may then cause rendering pass vertex shader 56, via controller 30, to retrieve the attributes for only those vertices that were determined to be visible. Graphics driver 26 may also output those instructions that were not part of binning pass vertex shader 46 for rendering pass vertex shader 56 to perform. Rendering pass vertex shader 56 may be a fixed-function unit of one or more fixed-function units 34 and may output the processed attributes to a local memory of GPU 12 (e.g., cache)

Rasterizer circuit 58 receives the attribute data for vertices of primitives from both streamout buffer 52 and the local memory of GPU 12 that stores the output from rendering pass vertex shader 56 and converts the primitives into pixels for the display. For example, the primitives may be defined as vectors that indicate the interconnection of the primitives, and may be defined in a coordinate space that is independent of the display on which the image is to be displayed. Rasterizer circuit 58 converts these vectors into the display coordinates, and performs any additional functions such as removing points within primitives that are occluded. Rasterizer circuit 58 may be a fixed-function unit of one or more fixed-function units 34 and outputs values to pixel buffer 60.

Rasterizer circuit 58 may be configured to generate graphics data used for display based on attribute from both streamout buffer 52 and the local memory of GPU 12. The output of rasterizer circuit 58 is graphics data that is used for display. For instance, additional components of GPU 12 receive the graphics data generated by rasterizer circuit 58 for further processing and generating graphics data for display.

Pixel shader 62 receives the pixels from pixel buffer 60 as outputted by rasterizer circuit 58 and performs post processing to assign color values to each of the pixels that are to be displayed. For example, pixel shader 62 may receive constant values stored in system memory 10, texture data stored in system memory 10, and any other data to generate per-pixel outputs such as color values. Pixel shader 62 may also output opacity values that indicate the opaqueness of the pixels. Pixel shader 62 may output the resulting pixel values to frame buffer 64.

Although not illustrated, in some examples, pixel shader 62 may output to an output merge circuit for any final pixel processing. For example, the output merge circuit may utilize depth information to further determine whether any of the pixels should be removed from being displayed. The output merge circuit may also perform blending operations to generate final pixel values. In such examples, the output merge circuit may output the final pixel values to frame buffer 64.

The above example described the case where a vertex is visible. However, for a second vertex that is not visible, the process may be different. For example, binning pass vertex shader 46 may process a first subset of attributes of a vertex, and depth test circuit 50 may determine that the vertex is not visible. In this case, rendering pass circuitry 54 may avoid the processing of a second subset of attributes (e.g., remaining attributes) of the vertex in response to determination that the vertex is not visible.

Figure 4:
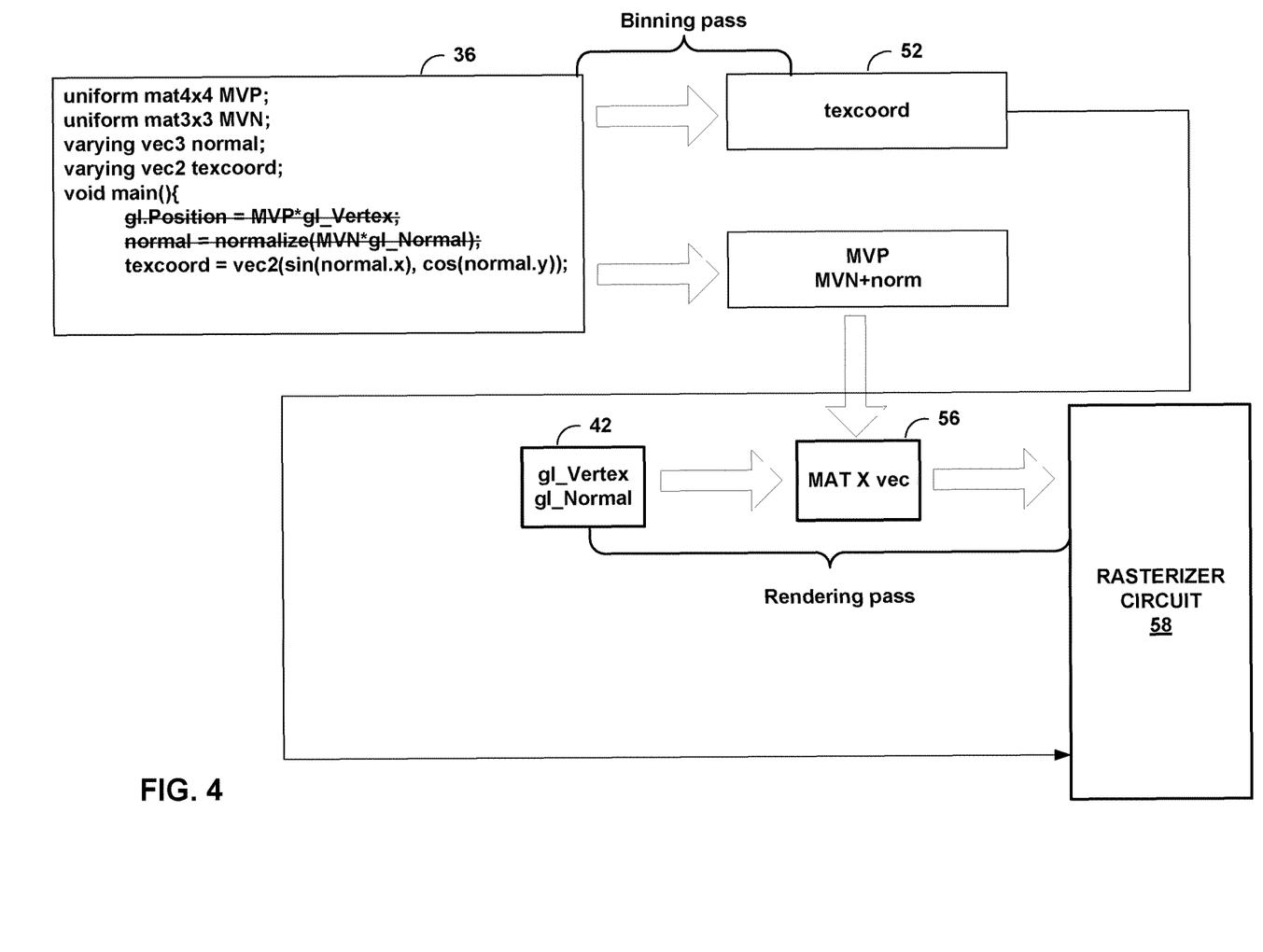
FIG. 4 is a conceptual diagram illustrating an example process flow in accordance with one or more example techniques described in this disclosure.

FIG. 4 is a conceptual diagram illustrating an example process flow in accordance with one or more example techniques described in this disclosure. FIG. 4 illustrates one example of vertex shader source code 36 that includes instructions: gl_Position=MVP*gl_Vertex, where MVP is a static matrix and normal=normalize(MVN*gl_Normal), where MVN is a static matrix, and the normalize function is a function scaling a vector with a reciprocal of its norm. Vertex shader source code 36 also includes the instruction texcoord=vec2(sin(normal.x), cos(normal.y).

In this example, compiler 22 may determine that because normal=normalize(MVN*gl_Normal) includes only static matrix multiplication and scaling operations, these instructions do not need to be compiled and included in binning vertex shader object code 38, execution of which is the same as binning pass vertex shader 46 executing on shader core 32. However, compiler 22 may determine that the sine and cosine operations in the vec2(sin(normal.x), cos(normal.y)) instruction should be performed by binning pass vertex shader 46. Accordingly, as illustrated after the binning pass, streamout buffer 52 may store the value of texcoord because that instruction was executed by binning pass vertex shader 46.

Graphics driver 26 may output the MVP and MVN matrices to controller 30 so that controller 30 can cause rendering pass vertex shader 56 to perform the operations defined in the instructions. Rendering pass vertex shader 56 may receive, via controller 30, the gl_Vertex and gl_Normal values from vertex buffer 42. Then, during the rendering pass, rendering pass vertex shader 56 may perform the matrix multiplication to generate the gl_Position and normal values and store the values in a local memory of GPU 12.

Rasterizer circuit 58 receives the texcoord value from streamout buffer 52 and the result of rendering pass vertex shader 56 from the local memory of GPU 12. Rasterizer circuit 58 performs its operations on the processed attributes and the remaining stages of GPU 12 further process the data to generate graphics data for display. For example, rasterizer circuit 58 generates graphic data used for display, and the remaining states of GPU 12 further process the data generated by rasterizer circuit 58 to generate graphics data for display.

In the illustrated example, during binning pass, only attributes that are processed by binning pass vertex shader 46 are outputted from vertex buffer 42, and binning pass vertex shader 46 is a programmable vertex shader. All other attributes for the vertex may remain in vertex buffer 42. For these attributes, graphics driver 26 outputs the per-batch transformation matrices and normalization enabled flag (e.g., MVP and MVN matrices plus normalization enabled flag for normal attribute). During bin rendering, transformation is performed by rendering pass vertex shader 56, which may be a fixed-function hardware vertex shader. There may be no programmable vertex processing during rendering. The attributes processed by binning pass vertex shader 46 are directly read from streamout buffer 52. Rasterizer circuit 58 receives the whole set of vertex attributes (e.g., those processed by binning pass vertex shader 46 and those processed by rendering pass vertex shader 56) for rasterizaton and further processing.

Figure 5:
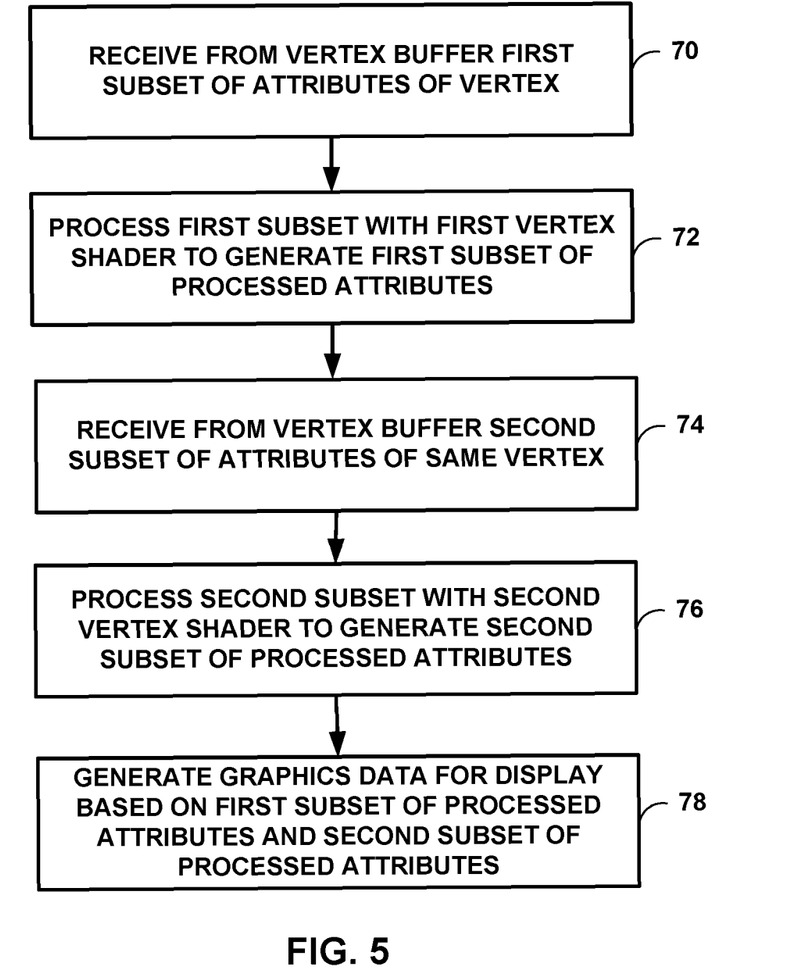
FIG. 5 is a flowchart illustrating an example method of processing data.

FIG. 5 is a flowchart illustrating an example method of processing data. For example, FIG. 5 illustrates example techniques of utilizing two different vertex shaders, each operating in different graphics processing passes.

A first vertex shader of GPU 12 may receive from vertex buffer 42 a first subset of attributes of a vertex (70). For example, binning pass vertex shader 46 may receive attributes that compiler 22 determined should be processed by binning pass vertex shader 46 including determination of vertex visibility.

The first vertex shader (e.g., binning pass vertex shader 46) may process the first subset of attributes of the vertex to generate a first subset of processed attributes (72). This processing of the first subset of attributes may occur during a binning pass, where the binning pass includes determining which vertices belong to which tile (e.g., via binning circuit 48). The first subset of attributes include attributes used for determining visibility of the vertex. Also, processing the first subset of attributes may include executing the first vertex shader on shader core 32, and processing the first subset of attributes based on the execution of the first vertex shader.

A second vertex shader of GPU 12 may receive from vertex buffer 42 a second subset of attributes of the same vertex (74). For example, rendering pass vertex shader 56 may receive attributes that compiler 22 determined were not to be processed by binning pass vertex shader 46.

The second vertex shader (e.g., rendering pass vertex shader 56) may process the second subset of attributes of the vertex to generate a second subset of processed attributes (76). This processing of the second subset of attributes may occur during a rendering pass, where the rendering pass includes generating the graphics data for display (e.g., via pixel shader 62 or subsequent output merge circuit). The second vertex shader includes a fixed-function hardware vertex shader. In some examples, processing the second subset of attributes may include executing the second vertex shader on shader core 32, and processing the second subset of attributes based on the execution of the second vertex shader.

GPU 12 may generate graphics data for display based on the first subset of processed attributes and the second subset of processed attributes (78). For instance, rasterizer circuit 58 may generate graphics data used for display based on processed attributes of the first subset of processed attributes for vertices determined to be visible and the second subset of processed attributes. Rasterizer circuit 58 generates graphics data used for display (e.g., the graphics data that rasterizer circuit 58 outputs is used by additional components to generate graphics data for display). For instance, pixel shader 62 may receive the graphics data generated by rasterizer circuit 58, and further process the data to generate graphics data that is used for display. For vertices determined not to be visible, GPU 12 may avoid the processing of the second subset of attributes based on the determination that a vertex is not visible, and may instead discard the values.

Accordingly, binning pass circuitry 44 is configured to receive the first subset of attributes of the vertex and process the first subset of attribute with a first vertex shader (e.g., binning pass vertex shader 46) to generate a first subset of processed attributes. Rendering pass circuitry 54 is configured to receive the second subset of attributes of the vertex, and process the second subset of attributes with a second, different vertex shader (e.g., rendering pass vertex shader 56) to generate a second subset of processed attributes. Rendering pass circuitry 54 is configured to generate graphics data for display based on the first subset of processed attributes and the second subset of processed attributes.

Binning pass circuitry 44 may be considered as including shader core 32 because binning pass vertex shader 46 executes on shader core 32. As described above, shader core 32 may be configured to execute the first vertex shader (e.g., binning pass vertex shader 46), and process the first subset of attributes based on the execution of the first vertex shader. Rendering pass vertex shader 56 is an example of the second, different vertex shader such as where the second vertex shader is a fixed-function hardware vertex shader.

However, in some examples, rendering pass vertex shader 56 may be software based. For such examples, rendering pass circuitry 54 may also include shader core 32. For instance, shader core 32 may be shared by both binning pass circuitry 44 and rendering pass circuitry 54. Binning pass circuitry 44 includes shader core 32 for executing binning pass vertex shader 46, and rendering pass circuitry 54 includes shader core 32, generally, for executing pixel shader 62, but also for executing rendering pass vertex shader 56 in examples where rendering pass vertex shader 56 is not a fixed-function hardware vertex shader. In such examples, rendering pass circuitry 54 includes shader core 32, and to process the second subset of attributes, shader core 32 is configured to execute the second vertex shader (e.g., rendering pass vertex shader 56), and process the second subset of attributes based on the execution of the second vertex shader.

In some examples, as part of generating the graphics data, the first vertex shader may output the first subset of processed attributes to streamout buffer 52 external to GPU 12 (e.g., binning pass circuitry 44 outputs the first subset of processed attributes to streamout buffer 52), and rasterizer circuit 58 of rendering pass circuitry 54 may receive the first subset of processed attributes from streamout buffer 52. The second vertex shader may output the second subset of processed attributes to a local memory of GPU 12 (e.g., cache of GPU 12) (e.g., rendering pass circuitry 54 outputs the second subset of processed attributes to the local memory), and rasterizer circuit 58 of rendering pass circuitry 54 may receive the second subset of processed attributes from the local memory. Rasterizer circuit 58 may then process the all of the attributes (e.g., both the first and second subsets) of the vertex and provide the resulting data to pixel shader 62 for generating the graphics data for display.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Various aspects and examples have been described. However, modifications can be made to the structure or techniques of this disclosure without departing from the scope of the following claims.

What is claimed is:

1. A method of processing data, the method comprising:
receiving from a vertex buffer a first subset of attributes of a vertex;
processing the first subset of attributes of the vertex with a first vertex shader of a graphics processing unit (GPU) to generate a first subset of processed attributes, wherein the first vertex shader comprises a software-based vertex shader;
receiving from the vertex buffer a second subset of attributes of the same vertex;
processing the second subset of attributes of the same vertex with a second, different vertex shader of the GPU to generate a second subset of processed attributes, wherein the second vertex shader comprises a hardware vertex shader, and wherein one or more attributes of the first subset of attributes are different than one or more attributes of the second subset of attributes; and
generating graphics data for display based on the first subset of processed attributes and the second subset of processed attributes.

2. The method of claim 1, wherein processing the first subset of attributes comprises processing the first subset of attributes during a binning pass, the binning pass comprising determining which vertices belong to which tile, and wherein processing the second subset of attributes comprises processing the second subset of attributes during a rendering pass, the rendering pass comprising generating the graphics data for display.

3. The method of claim 1, wherein processing the first subset of attributes comprises:
executing the first vertex shader on a shader core; and
processing the first subset of attributes based on the execution of the first vertex shader.

4. The method of claim 1, wherein the vertex comprises a first vertex, the method further comprising:
processing a first subset of attributes of a second vertex with the first vertex shader;
determining that the second vertex is not visible; and
avoiding the processing of a second subset of attributes of the second vertex in response to the determination that the second vertex is not visible.

5. The method of claim 1, further comprising:
outputting the first subset of processed attributes to a streamout buffer external to the GPU;
receiving with a rasterizer circuit the first subset of processed attributes from the streamout buffer;
outputting the second subset of processed attributes to a local memory internal to the GPU; and
receiving with the rasterizer circuit the second subset of processed attributes from the local memory.

6. The method of claim 1, wherein generating graphics data for display based on the first subset of processed attributes and the second subset of processed attributes comprises generating graphics data for display based on processed attributes of the first subset of processed attributes for vertices determined to be visible and the second subset of processed attributes.

7. The method of claim 1, wherein the first subset of attributes comprises attributes used for determining visibility.

8. The method of claim 1, further comprising:
determining that the second subset of attributes comprises only attributes that are to be multiplied by a static matrix,
wherein processing the second subset of attributes comprises processing only the attributes that are to be multiplied by the static matrix with the second vertex shader.

9. A device for processing data, the device comprising:
a memory comprising a vertex buffer configured to store a first subset of attributes of a vertex and a second subset of attributes of the same vertex;
a graphics processing unit (GPU) comprising binning pass circuitry and rendering pass circuitry,
wherein the binning pass circuitry is configured to:
receive the first subset of attributes of the vertex; and
process the first subset of attributes with a first vertex shader to generate a first subset of processed attributes, wherein the first vertex shader comprises a software-based vertex shader, and
wherein the rendering pass circuitry is configured to:
receive the second subset of attributes of the vertex;
process the second subset of attributes with a second, different vertex shader to generate a second subset of processed attributes, wherein the second vertex shader comprises a hardware vertex shader, and wherein one or more attributes of the first subset of attributes are different than one or more attributes of the second subset of attributes; and
generate graphics data for display based on the first subset of processed attributes and the second subset of processed attributes.

10. The device of claim 9, wherein the binning pass circuitry comprises a shader core, and wherein to process the first subset of attributes, the shader core is configured to:
execute the first vertex shader; and
process the first subset of attributes based on the execution of the first vertex shader.

11. The device of claim 9, wherein the vertex comprises a first vertex, wherein the binning pass circuitry is configured to process a first subset of attributes of a second vertex with the first vertex shader, and determine that the second vertex is not visible, and wherein the rendering pass circuitry is configured to avoid the processing of a second subset of attributes of the second vertex in response to the determination that the second vertex is not visible.

12. The device of claim 9, wherein the binning pass circuitry is configured to output the first subset of processed attributes to a streamout buffer, wherein the rendering pass circuitry is configured to output the second subset of processed attributes to a local memory, wherein the rendering pass circuitry comprises a rasterizer circuit configured to receive the first subset of processed attributes from the streamout buffer and receive the second subset of processed attributes from the local memory.

13. The device of claim 9, wherein the rendering pass circuitry is configured to generate graphics data for display based on processed attributes of the first subset of processed attributes for vertices determined to be visible and the second subset of processed attributes.

14. The device of claim 9, wherein the first subset of attributes comprises attributes used for determining visibility.

15. The device of claim 9, wherein the GPU is configured to receive information that the second subset of attributes comprises only attributes that are to be multiplied by a static matrix, and wherein the rendering pass circuitry is configured to process only the attributes that are to be multiplied by the static matrix with the second vertex shader.

16. The device of claim 9, wherein the device comprises one of a personal computer, a desktop computer, a laptop computer, a computer workstation, a video game platform or console, a wireless communication device, a display device, a television, or a television set-top box.

17. A non-transitory computer-readable storage medium having instructions stored thereon that when executed cause a graphics processing unit (GPU) to:
receive from a vertex buffer a first subset of attributes of a vertex;
process the first subset of attributes of the vertex with a first vertex shader of the GPU to generate a first subset of processed attributes, wherein the first vertex shader comprises a software-based vertex shader;
receive from the vertex buffer a second subset of attributes of the same vertex;
process the second subset of attributes of the same vertex with a second, different vertex shader of the GPU to generate a second subset of processed attributes, wherein the second vertex shader comprises a hardware vertex shader, and wherein one or more attributes of the first subset of attributes are different than one or more attributes of the second subset of attributes; and
generate graphics data for display based on the first subset of processed attributes and the second subset of processed attributes.

18. The non-transitory computer-readable storage medium of claim 17, wherein the vertex comprises a first vertex, the instructions further comprising instructions that cause GPU to:

process a first subset of attributes of a second vertex with the first vertex shader;
determine that the second vertex is not visible; and
avoid the processing of a second subset of attributes of the second vertex in response to the determination that the second vertex is not visible.

19. The non-transitory computer-readable storage medium of claim 17, wherein the first subset of attributes comprises attributes used for determining visibility.

20. The non-transitory computer-readable storage medium of claim 17, further comprising instructions that cause the GPU to:
receive information that the second subset of attributes comprises only attributes that are to be multiplied by a static matrix,
wherein the instructions that cause the GPU to process the second subset of attributes comprise instructions that cause the GPU to process only the attributes that are to be multiplied by the static matrix with the second vertex shader.

21. A device for processing data, the device comprising:
means for receiving from a vertex buffer a first subset of attributes of a vertex;
means for processing the first subset of attributes of the vertex with a first vertex shader of a graphics processing unit (GPU) to generate a first subset of processed attributes, wherein the first vertex shader comprises a software-based vertex shader;
means for receiving from the vertex buffer a second subset of attributes of the same vertex;
means for processing the second subset of attributes of the same vertex with a second, different vertex shader of the GPU to generate a second subset of processed attributes, wherein the second vertex shader comprises a hardware vertex shader, and wherein one or more attributes of the first subset of attributes are different than one or more attributes of the second subset of attributes; and
means for generating graphics data for display based on the first subset of processed attributes and the second subset of processed attributes.

22. The device of claim 21, wherein the vertex comprises a first vertex, the device further comprising:
means for processing a first subset of attributes of a second vertex with the first vertex shader;
means for determining that the second vertex is not visible; and
means for avoiding the processing of a second subset of attributes of the second vertex in response to the determination that the second vertex is not visible.

23. The device of claim 21, wherein the first subset of attributes comprises attributes used for determining visibility.

24. The device of claim 21, further comprising:
means for receiving information that the second subset of attributes comprises only attributes that are to be multiplied by a static matrix,
wherein the means for processing the second subset of attributes comprises means for processing only the attributes that are to be multiplied by the static matrix with the second vertex shader.

* * * * *